United States Patent [19]

Domigan

[11] Patent Number: 4,876,834
[45] Date of Patent: Oct. 31, 1989

[54] DOUBLE ADJUSTABLE DUCT SUPPORT

[75] Inventor: Charles N. Domigan, Coolville, Ohio

[73] Assignee: Butler Manufacturing Company, Kansas City, Del.

[21] Appl. No.: 230,489

[22] Filed: Aug. 9, 1988

[51] Int. Cl.$^4$ .............................................. E04B 5/48
[52] U.S. Cl. .................. 52/126.2; 52/126.5; 52/126.6; 248/188.4
[58] Field of Search ............... 52/126.2, 126.1, 126.5, 52/126.6, 126.3; 248/222.4, 188.4, 125

[56] References Cited

U.S. PATENT DOCUMENTS

| | | | |
|---|---|---|---|
| 1,697,800 | 1/1929 | Freiher | 52/126.5 |
| 2,973,932 | 3/1961 | Van Huis et al. | 248/125 |
| 2,988,017 | 6/1971 | Stough | 248/222.4 |
| 3,166,633 | 1/1965 | Guzan, Jr. et al. | 52/126.2 |
| 3,550,336 | 12/1970 | Halkovich | 52/126.2 |
| 3,704,846 | 12/1972 | Clark | 248/125 |
| 4,404,780 | 9/1983 | Josephson | 52/126.7 |
| 4,598,510 | 7/1986 | Wagner | 52/126.6 |
| 4,680,904 | 7/1987 | Stoecker | 52/126.3 |
| 4,759,162 | 7/1988 | Wyse | 52/126.6 |

FOREIGN PATENT DOCUMENTS

| | | | |
|---|---|---|---|
| 1577362 | 8/1969 | France | 52/126.1 |
| 294789 | 4/1932 | Italy | 52/126.5 |

Primary Examiner—Michael Safavi
Attorney, Agent, or Firm—Frederick J. Olsson

[57] ABSTRACT

A duct support, for infloor electrical distribution systems, which has two separate adjustments within the same structure. One being a large adjustment which can be made quickly without the use of screw threads. The other being a small, precise, screw-thread adjustment which may be made when the support is in any one of the large adjusted positions.

1 Claim, 1 Drawing Sheet

DOUBLE ADJUSTABLE DUCT SUPPORT

This invention relates to underfloor or infloor electrical distribution systems for concrete floors and in particular relates to support means for mounting and leveling infloor duct prior to the pouring of the concrete. Such support means are mounted either on a concrete pouring form or on a concrete subfloor which is to receive a pour for the finish floor.

Conventional supports of the kind in question have, since underfloor or infloor came onto the scene, employed adjusting screws alone or a variety of legs each of a different length and each supporting an adjusting screw head at a different height. The conventional arrangement which employs screws alone is highly disadvantageous because the adjustment process is very time-consuming and results in high labor costs. The other arrangement which employs a variety of legs of different lengths and screw head heights is disadvantageous because it requires a collection of legs of varying heights to be held in inventory and usually the amount of adjusting screw adjustment is relatively large.

The principal objective of the invention is to provide a duct support which eliminates the above disadvantages.

The invention contemplates a duct support which has two separate adjustments within the same structure, one is a large adjustment made quickly without the use of screw threads and the other is a small, precise, screw-thread adjustment which may be made when the support is in any one of the large adjusted positions.

With the ability to quickly make a required large adjustment and followed, if necessary, by a small precise adjustment a great deal of labor time is saved. With the same structure capable of both large and vernier adjustment inventory costs are lowered.

The invention will be described below in connection with the following drawings wherein.

The term "duct" as used herein will be understood to encompass No. 2 and No. 4 underfloor duct, multi-cell cellular raceway, and trench duct.

Figure 1:
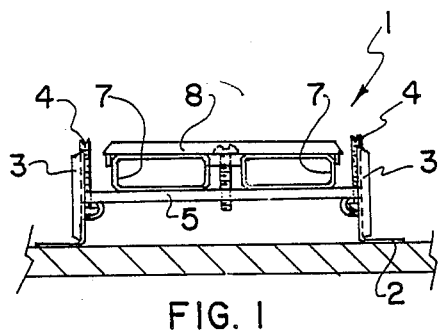
FIG. 1 is a sectional elevational view of a prior art adjustable duct support shown mounted on a pouring form and carrying a pair of underfloor ducts.

Referring to FIG. 1 a conventional adjustable duct support 1 is mounted on a concrete pouring form 2. This duct support has a pair of legs 3 nailed to the form 2 and carring adjusting screws 4 which support a bridge 5. On the bridge are a pair of No. 4 ducts 7 which are secured to the bridge by holddown 8. The holddown includes means to keep the ducts separated. In such a conventional arrangement, compatibility with the height of the pour is attained by employing different length legs supporting adjusting screws at different heights.

Figure 2:
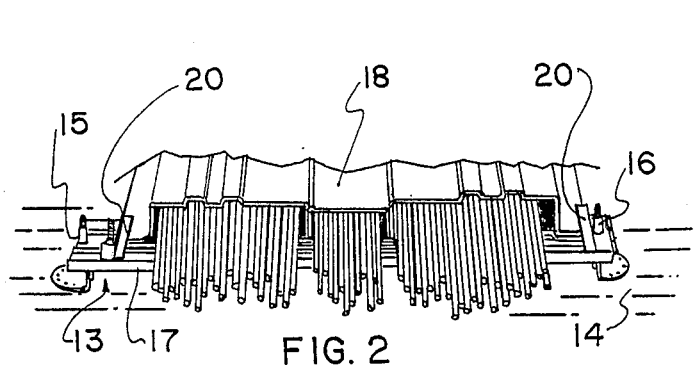
FIG. 2 is a perspective view of a prior art adjustable duct support mounted on a concrete slab subfloor and carrying a cellular raceway.

Referring to FIG. 2 a conventional adjustable duct support 13 is mounted on a concrete slab subfloor 14. The duct support has a pair of adjusting screw type legs 15 and 16 which mount a bridge 17. The bridge carries a cellular raceway 18 which is secured in a position by holddown clamps 20. In the arrangement of FIG. 2 the adjusting screw legs provide for all of the vertical adjustment.

With the above in mind, the contrasting difference between and the advantages of the invention over the prior art arrangements will be readily apparent from the description which appears below.

Figure 3:
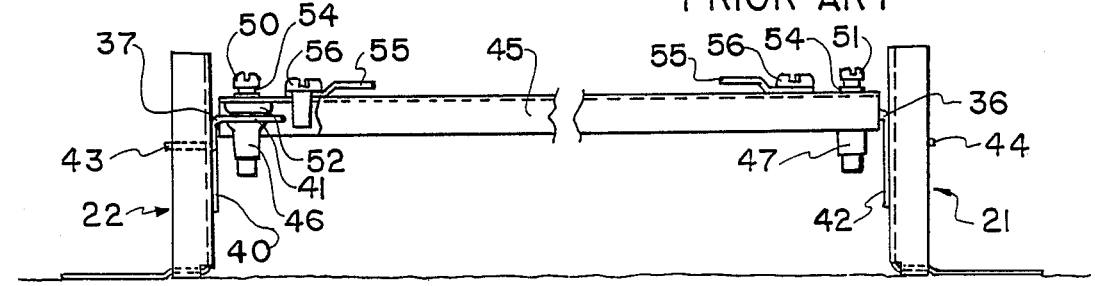
FIG. 3 is a side elevational view of a duct support according to the invention.
Figure 4:
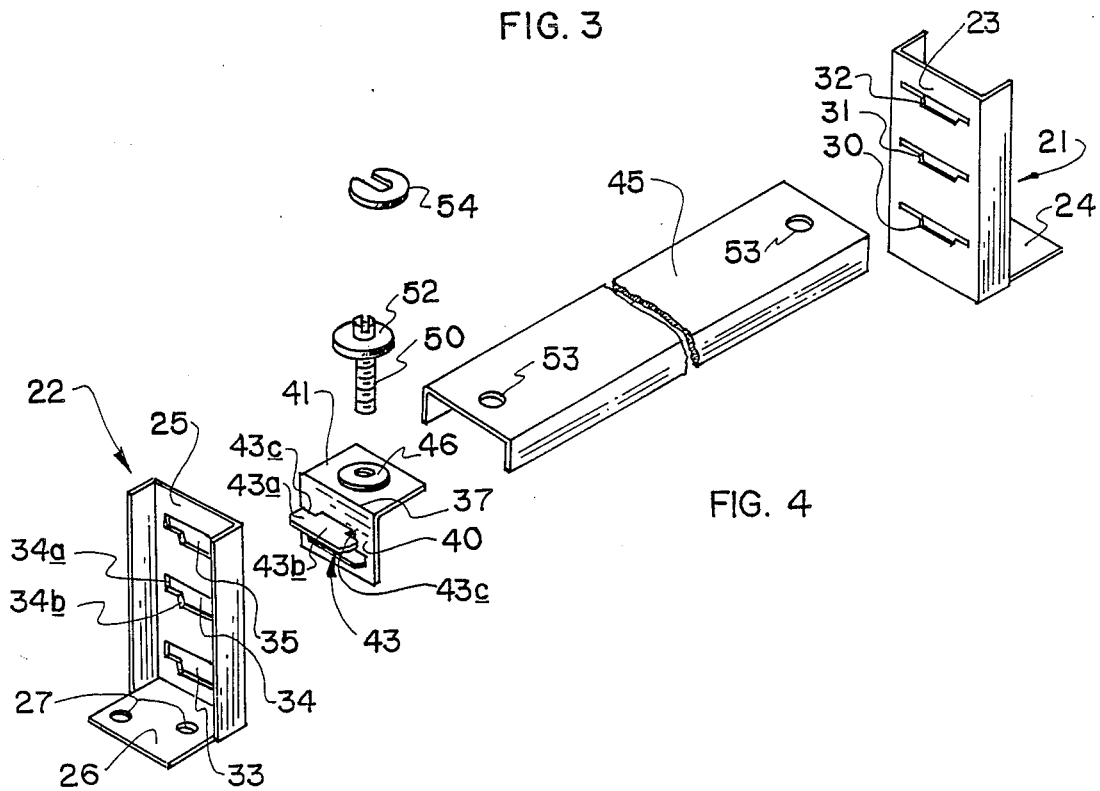
FIG. 4 is an exploded view of components of the duct support of FIG. 3.

Referring to FIGS. 3 and 4, the support has a pair of spaced standards 21 and 22. The standard 21 has vertically extending upright section 23 and a foot section 24 and the standard 22 has vertically extending upright section 25 and foot section 26. The foot sections have clearance apertures (as noted for foot 26 at 27) by which the same are fastened to the concrete.

The upright 23 has a plurality of vertically spaced adjusting apertures or slots 30, 31, and 32 each at a fixed distance from the foot 24. The upright 25 has corresponding adjusting apertures or slots 33, 34, and 35. The total of the three adjusting slots per upright section is exemplary. However, the three slots and their respective vertical distances from the feet were chosen so as to be compatible with the greatest number of floor conditions. By way of example the slot 30 is ¾ inches above the foot, the slot 31 is spaced ⅜ inches from slot 31. The same conditions prevail for slots 33–35.

A pair of angular adjusting supports 36 and 37 are adapted to be firmly but removably connected to the upright sections 23 and 25. (For reasons of clarity, the support 36 is not shown in FIG. 4.) The support 37 has a vertically extending adjusting arm 40 and a horizontally extending mounting arm 41. The vertical adjusting arm for the support 36 is shown at 42 in FIG. 3.

As will be apparent, the adjusting arms 40 and 42 respectively engage one side of the upright sections 23 and 25 and that the respective horizontal mounting arms extend toward one another.

Each adjusting arm carries a plunger or an adjusting tab, the plunger or tab for the arm 40 being indicated at 43 and the plunger or tab for the arm 42 being indicated at 44. The plungers or adjusting tabs are adapted to fit into the adjusting apertures or slots to rigidly but releasably hold its adjusting support on the standard. Since the adjusting slots and tabs are identical, the explanation of function will be done in connection with the tab 43 and slot 34 shown in FIG. 4.

The slot 34 has a wide section 34a and a narrow section 34b. The tab 43 has a wide section 43a and a narrow section 43b. The width of the wide slot section 34a is slightly greater than the width of the wide tab section 43a. The width of the narrow slot section 34b is slightly greater than the width of the narrow tab section 43b. The spaces 43c on the opposite sides of the narrow section 43b between the arm 40 and the wide section 43a is just slightly greater than the thickness of the upright section 25. The above structure provides for the wide section 43a to be inserted thru the wide slot 34a and then for the adjusting arm to be pushed downwardly so that the narrow section 43b goes down into the narrow section 34b and the upright section 25 fills the spaces 43c. Thus, the adjusting arm 40 is firmly supported on standard 22 with virtually no relative motion between the same.

The mounting arms mount a bridge member 45. The manner in which this is done will now be explained.

The mounting arms of the angular supports 36 and 37 each carry a Riv-Nut. These nuts are indicated at 46 and 47. The nuts carry adjusting screws 50 and 51 each having a support platform such as The platform 52 for screw 50.

The bridge member 45 has clearance holes 53 which provide for the bridge member to fit down over the heads of the screws and rest on the platforms. Locking rings (such as locking ring 54) fit into slots in the heads of the screws and bear on the bridge to hold same down on the platforms.

As noted in FIG. 3 the bridge 45 has hold down clamps 55 (similar to clamps 20 in FIG. 2) secured to the bridge by screws 56 which, when a cellular raceway unit is mounted on the bridge, are adapted to fit over the flat outer edges of the unit. When the bridge is to carry underfloor ducts, an over-the-duct strap similar in construction to the hold-down 8 of FIG. 1 is employed in place of the clamps 55. The strap is secured to the bridge by the screws 56.

The manner in which the duct support functions is very simple and will be explained below.

First of all, the known height of the duct and the known height of the insert to be employed are added together and this sum is subtracted from the distance between the floor line and the top of the slab or form. This gives the distance between the bottom of the duct (top of the bridge) and the form or slab. The adjusting slots are positioned vertically to correspond generally to standard duct, insert, and concrete floor thickness so that once desired position of the bridge is determined, the appropriate adjusting slots are selected for inserting the angular adjusting supports.

I claim:

1. A double adjustable duct support to be mounted on a concrete pouring form or on a concrete subfloor for supporting and leveling duct above the form or the floor, the support comprising:

a pair of spaced apart support standards each having a foot section and an upright section, each foot section to be mounted on and secured to a pouring form or a subfloor with the upright section extending substantially vertically upward therefrom and each upright section having a plurality of vertically spaced adjusting slots;

a pair of adjusting supports each having an adjusting arm and a mounting arm, the respective mounting arms extending toward one another and the adjusting arms respectively engaging one side of an upright section;

on each adjusting arm, an adjusting tab extending thru one of the adjusting slots in an upright section and engaging the opposite side of the upright section to cause the adjusting arm to tightly engage the upright section;

on each mounting arm, a nut and threaded in each nut an adjusting screw having a support platform and a head extending upwardly therefrom;

a bridge member having opposite end sections each of which has a clearance aperture receiving the head of an adjusting screw and being supported on the support platform of the adjusting screw;

said adjusting tabs and adjusting slots providing for said bridge member to be positioned vertically with respect to said feet in a plurality of discrete, spaced-apart positions; and said adjusting screws providing for said bridge member to be positioned vertically with respect to said feet when the bridge member is in any of said discrete, spaced-apart positions.

* * * * *